US006557026B1

(12) United States Patent
Stephens, Jr.

(10) Patent No.: US 6,557,026 B1
(45) Date of Patent: Apr. 29, 2003

(54) SYSTEM AND APPARATUS FOR DYNAMICALLY GENERATING AUDIBLE NOTICES FROM AN INFORMATION NETWORK

(75) Inventor: James H. Stephens, Jr., Austin, TX (US)

(73) Assignee: Morphism, L.L.C., Austin, TX (US)

( * ) Notice: Subject to any disclaimer, the term of this patent is extended or adjusted under 35 U.S.C. 154(b) by 0 days.

(21) Appl. No.: 09/427,233

(22) Filed: Oct. 26, 1999

Related U.S. Application Data

(63) Continuation-in-part of application No. 09/409,000, filed on Sep. 29, 1999.

(51) Int. Cl.[7] ............................................. G06F 15/16
(52) U.S. Cl. ...................... 709/203; 709/206; 709/219; 704/258; 704/260; 704/270
(58) Field of Search ................. 709/203, 206, 709/219; 704/260, 258, 270

(56) References Cited

U.S. PATENT DOCUMENTS

| | | | | |
|---|---|---|---|---|
| 5,944,786 A | * | 8/1999 | Quinn ........................ 709/206 |
| 5,963,217 A | * | 10/1999 | Grayson et al. ............ 345/473 |
| 6,021,433 A | * | 2/2000 | Payne et al. ................ 709/219 |
| 6,076,060 A | * | 6/2000 | Lin et al. .................... 704/260 |
| 6,088,673 A | * | 7/2000 | Lee et al. .................... 704/260 |
| 6,122,682 A | * | 9/2000 | Andrews ...................... 710/65 |
| 6,181,736 B1 | * | 1/2001 | McLaughlin et al. ....... 375/222 |
| 6,182,041 B1 | * | 1/2001 | Li et al. ...................... 704/260 |
| 6,282,511 B1 | * | 8/2001 | Mayer ........................ 704/270 |

* cited by examiner

Primary Examiner—Ayaz Sheikh
Assistant Examiner—Frantz B. Jean
(74) Attorney, Agent, or Firm—Winstead Sechrest & Minick P.C.; Michael P. Adams

(57) ABSTRACT

An apparatus and method for converting information from a text format to an audio format using distributed processing. A first set of computer readable program instructions receive information from a data source, convert the information from the text format to an intermediate format, and transmit the information in the intermediate format to a second data processor. A second set of program instructions, executable on the second data processor, are also included to convert the information from the intermediate format to the audio format. The first set of program instructions are executed on a remote, or server side, data processor, while the second set of program instructions are executed on a client side data processor. The first set of program instructions expand the information in the text format into phonemes using a grapheme to phoneme dictionary. The second set of program instructions convert the phonemes to audio output signals.

20 Claims, 6 Drawing Sheets

SYSTEM AND APPARATUS FOR DYNAMICALLY GENERATING AUDIBLE NOTICES FROM AN INFORMATION NETWORK

This is a continuation-in-part of application Ser. No. 09/409,000, filed Sep. 29, 1999, entitled "System and Apparatus For Dynamically Generating Audible Notices From An Information Network."

BACKGROUND OF THE INVENTION

1. Field of the Invention

This invention relates generally to devices for browsing information on an information network. More specifically, this invention relates to an apparatus and system for receiving personalized information from an information network in audio format using distributed text-to-speech processing.

2. Description of the Related Art

A number of different information networks are available that allow access to information contained on their computers, with the Internet being one that is generally known to the public. The capabilities, usefulness, and amount of information available from information networks are ever-increasing. Further, users often subscribe to one or more information services that are accessible via an information network. Currently, a user must browse the information network for information that is of interest to them. Oftentimes, a user must interrupt their use of an application program, such as spreadsheets or word processing programs, to browse the information network. Even messages sent from information networks to users via e-mail or instant messaging facilities require the user to take specific action to learn the content of the messages. Additionally, while some subscription services and portal services allow a user to customize the format and, to a certain extent, the content, of the information provided, a user must still manually navigate to the various sources of information to see if there is anything of interest to them. Still further, a user often has to sift through a lot of information that is of no interest to them, thereby consuming more time than necessary. Another drawback to current capabilities is that the user typically is not informed immediately when information of interest becomes available, but rather, must enter commands to browse the information sources, and therefore may not receive information of interest as soon as it is available.

In the prior art, systems are available to provide information requested from an information network in aural format, however, these systems require interaction with the user and do not provide the information that the user has indicated an interest in automatically as the information becomes available.

It is therefore desirable to provide users with the ability to prescreen information from various, selected sources, to reduce the amount of time required to find items of interest to the user.

It is also desirable to provide users with relevant information as soon as possible after the news becomes available.

It is also desirable to provide a summary of news items of interest to the user, and to allow the user to access more in-depth information regarding a particular summary.

It is further desirable to receive the information aurally, thereby allowing the user to receive information of interest without being required to interrupt their activity to manipulate or view the information.

There are several known methods for converting information from text format to audio format for output to an audio output device such as an audio speaker system. The information is typically in conventional orthography and the output is synthetic speech. The input is provided in the form of a digital signal which represents the characters of conventional orthography. The primary output is also a digital signal representing an acoustic waveform corresponding to the synthetic speech. Digital-to-analog conversion is a well known technique for producing analog signals which can drive audio speakers. The signal may have any convenient implementation, e.g. electrical, magnetic, electromagnetic or optical.

Speech converters usually include two major sub-units namely an analyzer and a synthesizer. The analyzer divides the original input signal into small textual elements. The synthesizer converts each of these small elements into a short segment of digital waveform and it also joins these together to produce the output.

It will be appreciated that the linguistic analysis of a sentence is exceedingly complicated since it involves many different linguistic tasks, and a wide variety of linguistic processors are commercially available, each of which is capable of doing at least one of the tasks. Further, different portions of the linguistic analysis can be distributed among at least two different data processors.

One category of linguistic processors is designated as "converters" in that they change the nature of the symbols utilized. For example a "converter" alters a signal representing a word or other linguistic element in graphemes into a signal representing the same element in phomenes using a grapheme to phoneme dictionary. This dictionary requires a large amount of storage space, and it is therefore preferable to store and maintain one dictionary in a central location, such as a network server, so that it may be accessed by several users, instead of storing and maintaining separate copies of the dictionary on each user's workstation. The benefits of maintaining large resources on servers are both ease of maintenance and reduced client system resource requirements. Further, converting the phonemes to an audio signal generates a large amount of data, and transferring the data in audio format requires a large amount of bandwidth.

The invention disclosed in U.S. patent application Ser. No. 09/409,000, filed Sep. 29, 1999, entitled "System and Apparatus For Dynamically Generating Audible Notices From An Information Network" discloses a text-to-speech (TTS) engine that resides either in a client-side processor, in a server-side processor, or which is distributed among data processors in the system. TTS processing functions are computationally intensive and some tasks require a large amount of storage space and bandwidth for data transfer. Therefore, it is further desirable to distribute the TTS engine between at least two data processors in a manner which optimizes processing time, data transfer, and storage space efficiency.

In addition to grapheme to phoneme TTS converters, there are other TTS engines that use different algorithms for transforming text data to audio data. Typically, these other TTS engines also involve converting text data to an intermediate format that requires less storage than the data in audio format. Therefore, it is also desirable to distribute other types of TTS engines between at least two data processors in a manner which optimizes processing time, data transfer, and storage space efficiency.

SUMMARY OF THE INVENTION

In one embodiment, the present invention provides a system for converting information from a text format to an audio format, wherein the text to speech conversion is distributed among two or more data processors. One data processor executes a first set of program instructions to receive information in text format from a data source, to convert the information from the text format to an intermediate format, such as phonemes, and to transmit the information in the intermediate format to the second data processor. The second data processor executes a second set of program instructions to convert the information from the intermediate format to the audio format. In one embodiment, the first data processor, such as a network server, includes one or more databases to aid TTS synthesis, such as one or more grapheme to phoneme dictionaries, that are accessible by multiple users. The second data processor is a client side data processor, such as a client workstation.

In another embodiment, the present invention provides a computer program product for dynamically generating audible notices from an information network using distributed text to speech processing. The information network includes a client processor and a remote processor, such as a network server. The computer program product includes a first set of program instructions that are executed on the remote processor that generate an intermediate representation of the information, such as a phonemic representation. The computer program product further includes a second set of program instructions that are executed on the client side processor that allow a user to preselect at least one data source that is accessible from the information network, to receive information from the at least one preselected data source, and to convert the information from a text format to an audio format based on the intermediate representation of the information.

In one embodiment, the first set of program instructions utilize a dictionary for translating graphemes to phonemes that is stored in a location that is accessible by the first set of program instructions.

In another embodiment, the present invention provides a method for dynamically generating audible notices from an information network which includes preselecting at least one data source from the information network, receiving information from the at least one preselected data source, converting the information from a text format to an intermediate format in a remote processor, converting the information from the intermediate format to an audio format in a client processor, and transmitting audio signals representative of the information in audio format. In one embodiment, the text is converted into an intermediate phonemic representation using a dictionary for translating graphemes to phonemes. The dictionary is stored in a location that is accessible by the remote processor. The phonemes are converted to audio output signals in the client processor.

Each embodiment of the present invention distributes the text to speech processing so that multiple users can take advantage of resources requiring a large amount of storage space from a remote, centralized processor, such as a network server. Intermediate processing of the information is performed at the remote processor to take advantage of the centralized resources, thus reducing the amount of data transfer from the remote processor to the client processor. The information, in intermediate format, is then transferred to the client processor, where it is converted to audio output signals. This feature also advantageously reduces data transfer requirements, since audio output format typically requires a large amount of data storage compared to the intermediate format.

The foregoing has outlined rather broadly the objects, features, and technical advantages of the present invention so that the detailed description of the invention that follows may be better understood.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The method and apparatus of the present invention is applicable to devices that access a computerized information network. A number of different information networks are available that allow access to information contained on their computers, with the Internet being one that is generally known to the public. While the Internet is used herein as an example of how the present invention is utilized, it is important to recognize that the present invention is also applicable to other information networks and information systems such as Intranets, database management systems, and document retrieval systems.

Figure 1:
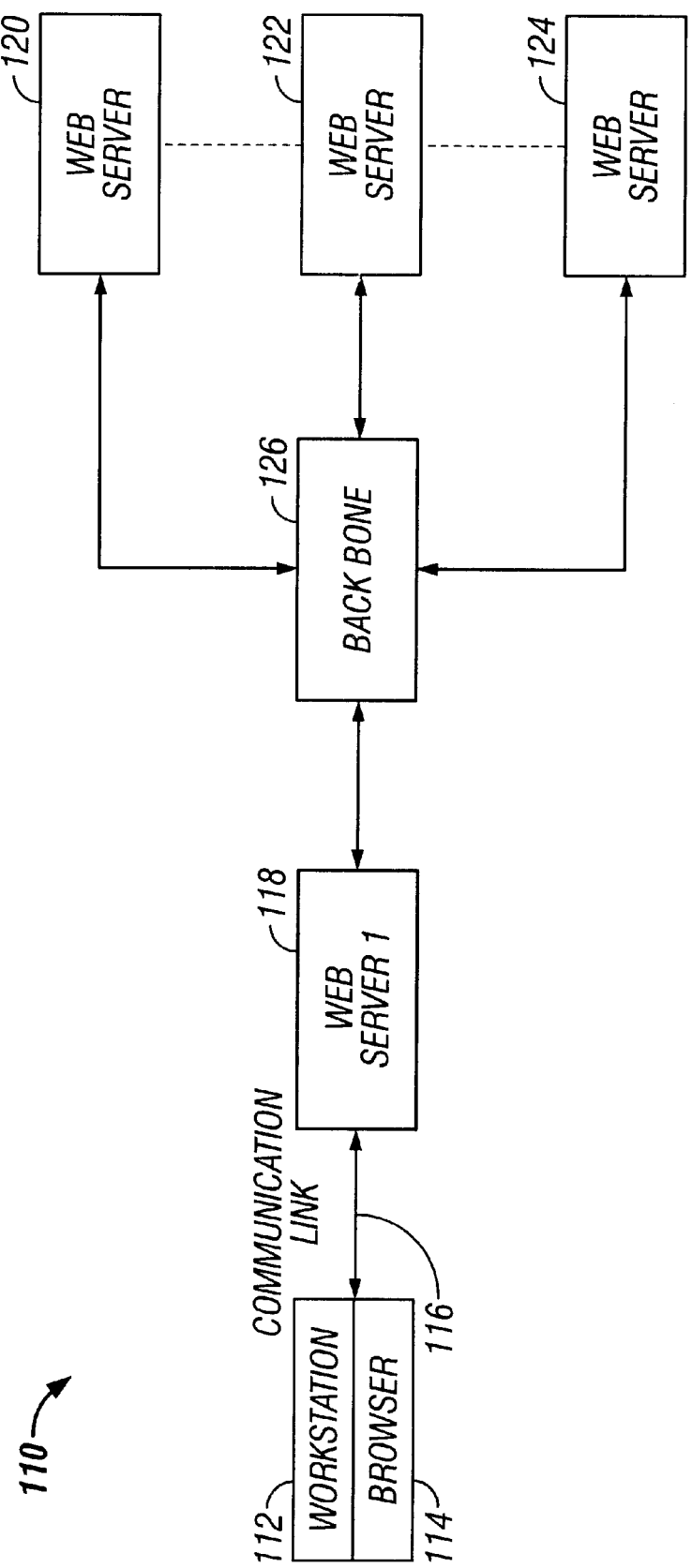
FIG. 1 is a block diagram of a system for accessing an information network found in the prior art.

An example of a typical Internet connection 110 found in the prior art is shown in FIG. 1. A user that wishes to access information on the Internet typically has a computer workstation 112 that executes an application program known as browser 114. Workstation 112 establishes a communication link 116 with web server 118 such as a dial-up wired connection with a modem, a direct link such as a T1 or ISDN line, or a wireless connection through a cellular or satellite network. When the user enters a request for information by entering commands in browser 114, workstation 112 sends a request for information, such as a search for documents pertaining to a specified topic, or a specific web page to web server 118. Each web server 118, 120, 122, 124 on the Internet has a known address which the user must supply to the browser 114 in order to connect to the appropriate web server 118, 120, 122, or 124. If the information is not available on the user's web server 118, a central link such as backbone 126 allows web servers 118, 120, 122, 124 to communicate with one another to supply the requested information. Because web servers 118, 120, 122, 124 can contain more than one web page, the user will also specify in the address which particular web page he wants to view. The web servers 118, 120, 122, 124 execute a web server application program, often referred to as a portal, which monitors requests, services requests for the information on that particular web server, and transmits the information to the user's workstation 112. A display generated by browser 114 to present information provided by a program on the server side is then presented on computer workstation 112. The display typically includes one or more areas for the user to enter commands and to view the information presented.

In the prior art, a web page is primarily visual data that is intended to be displayed on the display device, such as the monitor of user's workstation 112. When web server 118 receives a web page request, it will transmit a document, generally written in a markup language such as hypertext markup language (HTML) or extensible markup language (XML), across communication link 116 to the requesting browser 114. Communication link 116 may be one or a combination of different data transmission systems, such as a direct dial-up modem connected to a telephone line, dedicated high-speed data links such as Ti or ISDN lines, and even wireless networks which transmit information via satellite or cellular networks. Browser 114 interprets the markup language and outputs the web page to the monitor of user workstation 112. This web page displayed on the user's display may contain text, graphics, and links (which are addresses of other web pages). These other web pages (i.e., those represented by links) may be on the same or on different web servers 118, 120, 122, 124. The user can go to these other web pages by clicking on the links using a mouse or other pointing device. When web server 118 receives a search request, the request is sent to the server containing the search engine specified by the user. The search engine then compiles one or more pages containing a list of links to web pages on other web browsers 120, 122, 124 that may contain information relevant to the user's request. The search engine transmits the page(s) in markup language back to the requesting web server. This entire system of web pages with links to other web pages on other servers across the world is known as the "World Wide Web".

Figure 1A:
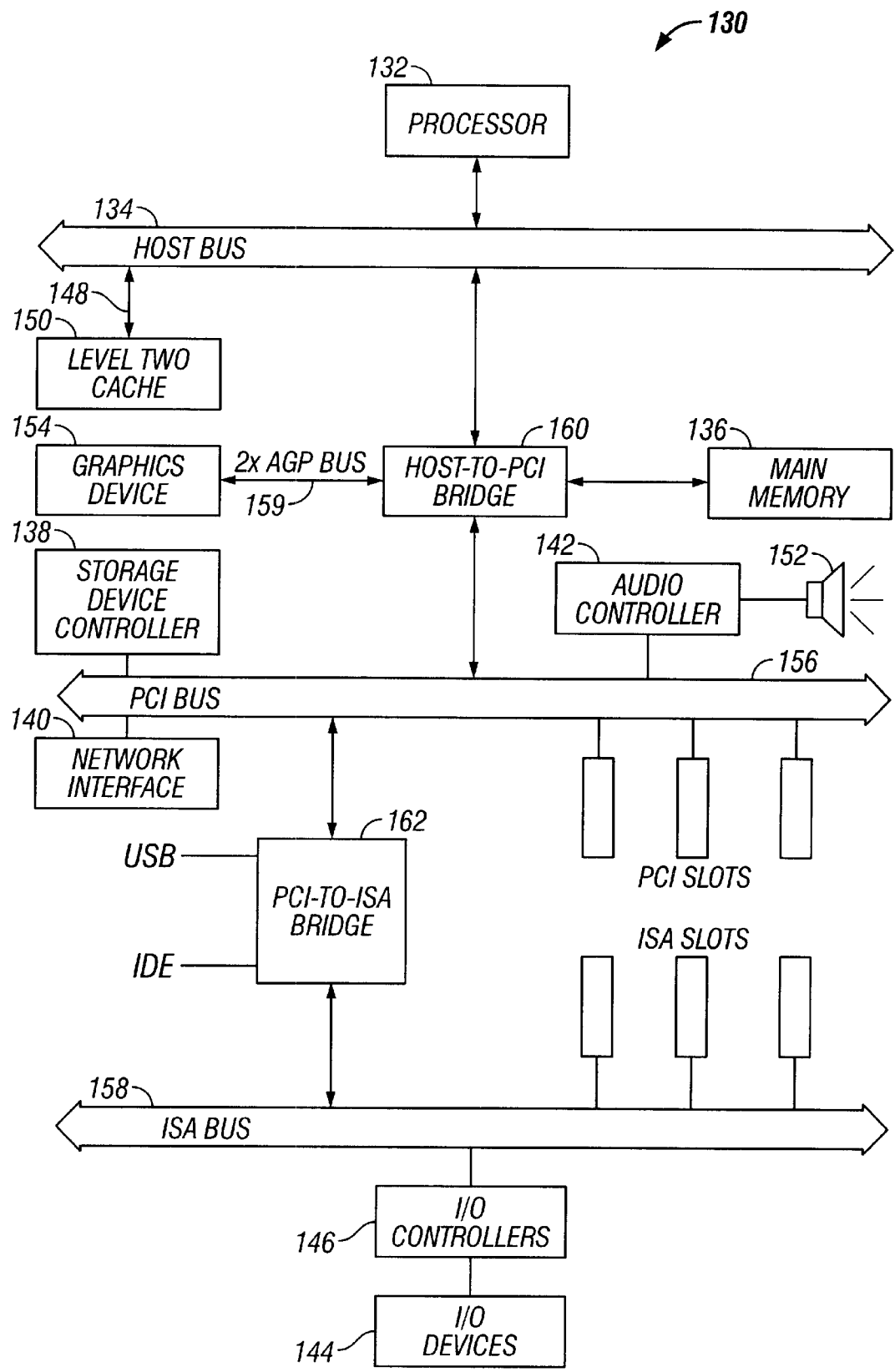
FIG. 1a is a block diagram of an example of a computer workstation found in the prior art with which the present invention may be utilized.

Workstation 112 and/or web servers 116 are computer systems, such as computer system 130 as shown in FIG. 1a. Computer system 130 includes central processing unit (CPU) 132 connected by host bus 134 to various components including main memory 136, storage device controller 138, network interface 140, audio and video controllers 142, and input/output devices 144 connected via input/output (I/O) controllers 146. Those skilled in the art will appreciate that this system encompasses all types of computer systems including, for example, mainframes, minicomputers, workstations, servers, personal computers, Internet terminals, network appliances, notebooks, palm tops, personal digital assistants, and embedded systems. Typically computer system 130 also includes cache memory 150 to facilitate quicker access between processor 132 and main memory 136. I/O peripheral devices often include speaker systems 152, graphics devices 154, and other I/O devices 144 such as display monitors, keyboards, mouse-type input devices, floppy and hard disk drives, DVD drives, CD-ROM drives, and printers. Many computer systems also include network capability, terminal devices, modems, televisions, sound devices, voice recognition devices, electronic pen devices, and mass storage devices such as tape drives. The number of devices available to add to personal computer systems continues to grow, however computer system 130 may include fewer components than shown in FIG. 1a and described herein.

The peripheral devices usually communicate with processor 132 over one or more buses 134, 156, 158, with the buses communicating with each other through the use of one or more bridges 160, 162. Computer system 130 may be one of many workstations or servers connected to a network such as a local area network (LAN), a wide area network (WAN), or a global information network such as the Internet through network interface 140.

CPU 132 can be constructed from one or more microprocessors and/or integrated circuits. Main memory 136 stores programs and data that CPU 132 may access. When computer system 130 starts up, an operating system program is loaded into main memory 136. The operating system manages the resources of computer system 130, such as CPU 132, audio controller 142, storage device controller 138, network interface 140, I/O controllers 146, and host bus 134. The operating system reads one or more configuration files to determine the hardware and software resources connected to computer system 130.

During operation, main memory 136 includes the operating system, configuration file, and one or more application programs with related program data. Application programs can run with program data as input, and output their results as program data in main memory 136 or to one or more mass storage devices through a memory controller (not shown) and storage device controller 138. CPU 132 executes one or more application programs, including one or more programs to establish a connection to a computer network through network interface 140. The application programs may be embodied in one executable module or may be a collection of routines that are executed as required. Operating systems commonly use "windows", as well known in the art, to present information about or from an application program. Each application program typically has its own window that is generated when the application program is executing. Each window may be minimized to an icon, maximized to fill the display, overlaid in front of other windows, and underlaid behind other windows.

Storage device controller 138 allows computer system 130 to retrieve and store data from mass storage devices such as magnetic disks (hard disks, diskettes), and optical disks (DVD and CD-ROM). The information from the DASD can be in many forms including application programs and program data. Data retrieved through storage device controller 138 is usually placed in main memory 136 where CPU 132 can process it.

One skilled in the art will recognize that the foregoing components and devices are used as examples for sake of conceptual clarity and that various configuration modifications are common. For example, audio controller 142 is connected to PCI bus 156 in FIG. 1a, but may be connected to the ISA bus 138 or reside on the motherboard (not shown) in alternative embodiments. As further example, although computer system 130 is shown to contain only a single main CPU 132 and a single system bus 134, those skilled in the art will appreciate that the present invention may be practiced using a computer system that has multiple CPUs 132 and/or multiple busses 134. In addition, the interfaces that are used in the preferred embodiment may include separate, fully programmed microprocessors that are used to off-load computationally intensive processing from CPU 132, or may include input/output (I/O) adapters to perform similar functions. Further, PCI bus 156 is used as an exemplar of any input-output devices attached to any I/O bus; AGP bus 159 is used as an exemplar of any graphics bus; graphics device 154 is used as an exemplar of any graphics controller; and host-to-PCI bridge 160 and PCI-to-ISA bridge 162 are used as exemplars of any type of bridge. Consequently, as used herein the specific exemplars set forth in FIG. 1 are intended to be representative of their more general classes. In general, use of any specific exemplar herein is also intended to be representative of its class and the non-inclusion of such specific devices in the foregoing list should not be taken as indicating that limitation is desired.

Figure 2:
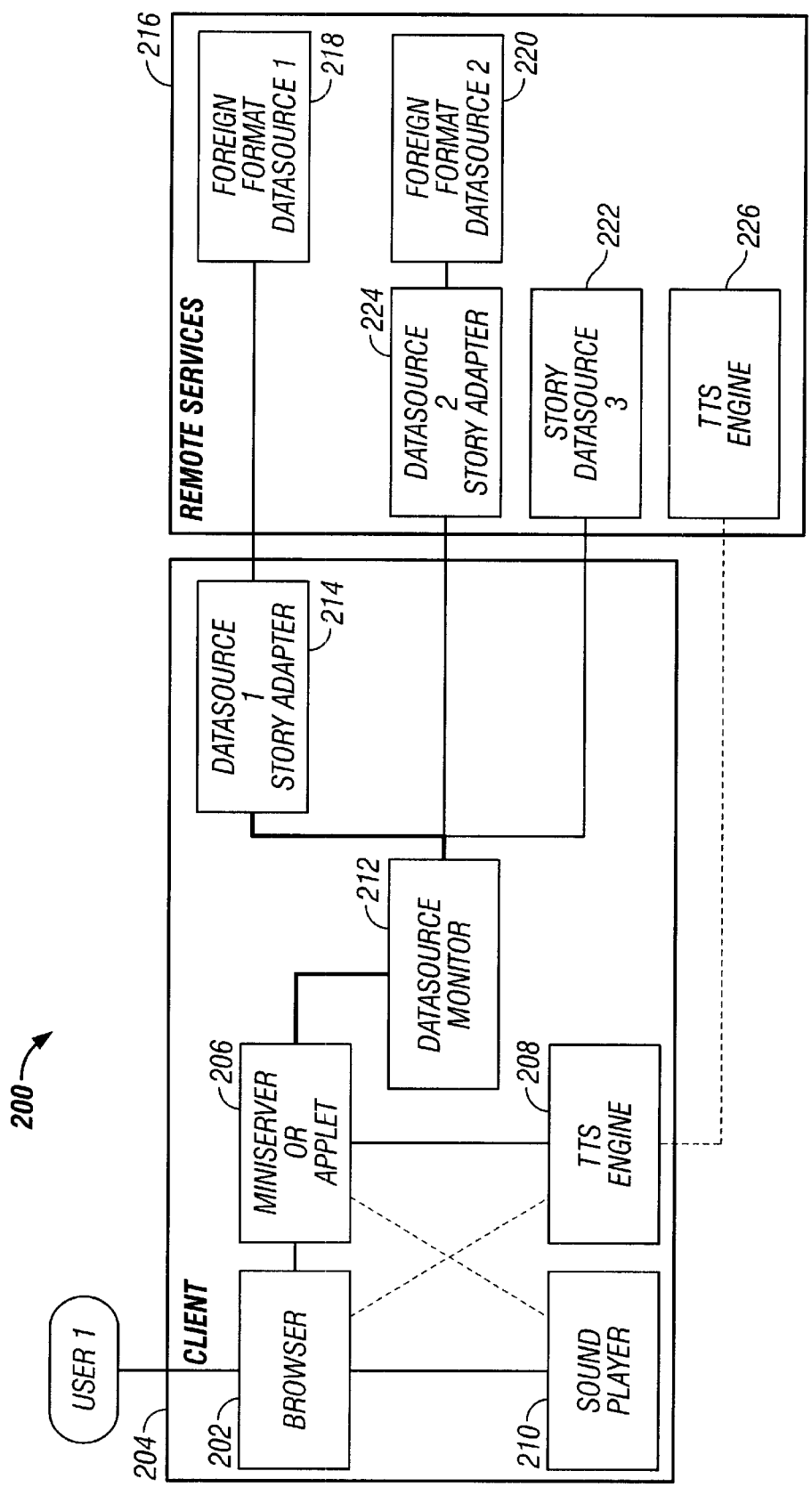
FIG. 2 is a block diagram of a two-tier architecture for providing speech-synthesized information in accordance with the present invention.

FIG. 2 shows a block diagram of components included in one embodiment of notice system 200 for dynamically generating audible notices from an information network according to the present invention. Notice system 200 allows a user to customize delivery of information based on, for example, the data source and a user's profile. Notice system 200 provides the information in speech-synthesized format as well as on the user's workstation display as the information becomes available. Notice system 200 may perform the following functions independently or in conjunction with other components in Internet connection 110:

- play headline audio for new, noteworthy stories as those stories appear;
- present the user with textual (typically HTML-rendered) story headlines;
- allow the user to select a headline to view the entire story;
- allow the user to subscribe and unsubscribe to data sources; and
- allow the user to set various preferences (e.g., monitoring schedules).

One benefit of notice system 200 is that the user does not have to monitor data sources manually because notice system 200 presents the headlines in audible format as they become available. The user does not have to take any action to receive up-to-date news as its appears, nor does the user have to interrupt his work to check data sources manually. For example, if a user subscribes to one or more services that provide world news and/or financial data sources, notice system 200 could be configured to report when the price of one or more specified stocks moves up or down by more than a given percent as the change is published by the stock quote data source. Further, the information will be output to the display associated with workstation 112 even when the window for notice system 200 is not visible on the user's screen. When the user hears a spoken headline of interest, he or she can use the display generated by notice system 200 to access one or more hyperlinks leading to page(s) that contain the full story for the headline. The user can specify criteria and parameters to prioritize reported stories, such criteria including, but not limited to user preferences, noteworthiness, and story metadata (e.g., a specified importance, expiration date, and/or urgency). Further, program instructions can be included in client 204 to monitor user behavior and generate criteria and parameters based on the user's previous interaction with notice system 200.

Notice system 200 also presents this news in text format in a browser window, which need not be visible when the story arrives. As the data sources post news stories, notice system 200 announces the headlines. Notice system 200 includes one or more news summary page listing all of the recent headlines. Each headline is a hyperlink to the web page that contains the full story. Optionally, summary pages may provide additional information with each headline. For example, the summary pages may include additional story text, graphics, or links.

Notice system 200 also includes text-to-speech (TTS) engine 208, sound player 210, data source monitor 212, and data source story adapter 214. Notice system 200 is a two-tier system having client 204 communicating directly with remote services 216. TTS engine 208 includes programs instructions for synthesizing speech into a standard audio format from textual input, such as markup language, and is commercially available from a variety of manufacturers. In the embodiment of the present invention shown in FIG. 2, TTS engine 208 may reside in client 204 or be a component in remote services 216, e.g., TTS engine 226.

A "story" in notice system 200 includes some or all of the following components:

- headline;
- story URL;
- optional source definition;
- optional identification;
- optional parameter;
- optional timestamp;
- optional advertisement; and
- optional additional data.

The story URL points to a web page (usually on the data source's site) that contains the full story. Notice system 200 specifies a default set of data sources, such as data sources 218, 220, 222. A story can also define new data sources, however. By including an optional source definition, a story can announce the new sources of information to users.

Another optional component of a story is a set of one or more parameters, which some data sources require to access information. For example, a financial data source requires a stock symbol to retrieve price quotes for a particular stock. Notice system 200 can accommodate zero, one, or more parameters for a particular data source.

A story may optionally contain a variety of other information such as an identification, a time stamp, the name of the author of a story, graphics, audio, video, advertisements, keywords, and categorization information. If a story does not have a time stamp, notice system 200 automatically assigns one to it. Client 204 outputs the story's headline in audible format using sound player 210. The story's headline may be marked up in a speech synthesis markup language.

Stories are available from a virtually unlimited variety of subscriber and non-subscriber data sources, such as data sources 218, 220, and 222. Notice system 200 includes a syntax for a textual representation of a story. This story syntax is also referred to as "story format". Information that is in a foreign format (i.e., not in story format) from data sources 218 and 220 is converted to story format in data source story adapters 214, 224. Stories that are supplied in story format, such as from data source 222, do not require conversion. Adapters 214, 224 are usually designed to convert source from one specific foreign format to story format. In one embodiment, the syntax for story format is defined by an XML document type definition (DTD), which allows a developer to define keyword assignments for tags and their associated parameters, as known in the art. Thus, data sources 218, 220 may provide information in story format, or, alternatively, client 204 may include one or more adapters to convert information from foreign formats to story format.

A user does not necessarily want to hear the headlines of all new stories from all available data sources. Otherwise, a user would be inundated with constant updates of information. For example, a user who subscribes to stock quotes would here a continues stream of price updates. Accordingly, the present invention allows a user to specify one or more data sources 218, 220, 222 from which to receive information, as well as one or more noteworthiness criterion for selecting stories presented to the user by notice system 200. If a data source has a noteworthiness criterion, notice system 200 reads a new story from that data source only if the story satisfies the criterion. The noteworthiness criteria that are available for selection is based on the type of information provided by a particular data source. For example, a stock quote data source noteworthiness criterion could be "price change greater than 1% from the last announced price". If the data source supplies more than one criterion, the user can select a conjunction or disjunction of criterion. Furthermore, a criterion can be parameterized, in which case the user supplies one or more parameters. For example, "percentage change in trading volume" is a parameterized stock quote criterion. The user could specify a parameter of "2%" to be informed of a volume change greater than 102% or less than 98% of the previously reported volume.

Data sources 218, 220, 222 publish stories and include the following components:
- name
- description URL
- stories URL
- optional schedule
- optional data source groups
- optional additional data The description URL points to a web page that describes data source 218, 220, 222. Notice system 200 uses the stories URL to get the latest stories data sources 218, 220, 222. The range of topics for stories is unlimited. For example, a product catalog can be specified as a data source. The stories are announcements of new products, discontinued products, improved products, etc. A weather forecast data source publishes forecast "stories". The automobile section of the classified advertisement section of a newspaper publishes classified ad "stories" about cars that are for sale. A ticker tape publishes stock quote "stories".

Further, a user may specify a data source category, which is a group of related data sources. For example, a "World News" data source category would contain data sources for world news stories. It would also contain data source categories for different countries and/or regions of the world such as Asia and the Middle East. A data source may belong to zero or more data source categories.

Notice system 200 includes a default set of data sources 218, 220, 222. In addition, a story can define a new data source. Such stories are referred to as source stories. A user reading a source story can subscribe to the source the story announces. A user can also manually enter a definition for a web-based format source. The definition requires at least the URL for data source stories. If a data source adapter 214, 224 is available, a user on a fat client notice system 200 can specify the location of the adapter. In this case, notice system 200 will download and install adapter 214, 224.

Client 204 includes browser 202 which interprets documents and scripts that are typically written in mark-up language. Client 204 generates a news page that is refreshed automatically via a 'Refresh' META tag or other mechanism for refreshing the display. The refresh rate can adapt to the rate of arrival of new stories or a refresh command may be pushed from miniserver 206 when a new story is sent to browser 202. Client 204 also either plays audio served from remote TTS engine 226, or the client invokes local TTS engine 208 to generate speech. If remote TTS engine 226 is used, browser 202 must be capable of playing audio. If local TTS engine 208 is used, either browser 202, TTS engine 208, or another set of program instructions in client 204 must be capable of playing audio.

Remote services 216 perform five primary functions: data source monitoring, data source management, data source interfacing, state management, and client services.

Notice system 200 includes capabilities for client 204 to pull stories from data sources 218, 220, 222, and for remote services 216 to push stories to client 204. For data sources that do not push stories to client 204, data source monitor 212 polls data sources 218, 220, 222 periodically to check the availability of new stories. The polling schedules can be fairly complex including an adaptive scheduler, which increases the polling frequency with the rate of arrival of new stories. The adaptive scheduler reduces the polling rate as the rate of arrival of new stories decreases. Static schedulers are also included, for example, hourly polling during business hours.

Data source management includes the creation, modification, and deletion of data sources 218, 220, 222.

Miniserver 206 manages state information including user registrations, subscriptions, data source definitions, stories, user preferences, user profiles, data source profiles, data source categories, and other information. Miniserver 206 stores most of the state information in relational databases.

Client services are all of the services notice system 200 requires including new story reports, subscription modifications, and user preferences modifications.

In one embodiment notice system 200 provides an optional auto-personalization feature whereby the user can choose to have notice system 200 model the user's interests. With this model, notice system 200 can automatically subscribe the user to sources relevant to the users interests. Notice system 200 can also direct relevant stories to the user from data sources to which the user doesn't subscribe.

Notice system 200 can categorize data sources 218, 220, 222 with either explicit data (e.g., as part of a data source definition) or derived data (from, e.g., machine learning techniques). Notice system 200 may categorize stories as well. A story can belong to one or more story categories. Each data source 218, 220, 222 is a de facto story category. Notice system 200 can use any story data—or data derived from the story—to categorize it.

Notice system 200 also monitors and dynamically logs its overall state, includes story arrival rates, errors, usage data, and other information.

Notice system 200 may serve audio advertisements with headlines. These audio ads can be personalized based on the headlines, the user's profile, and other information. Notice system 200 may also place advertisements on the summary pages served to client 204. The advertisements can be personalized based on the data source, current stories, the user's profile, and other information that may be customized by the user. Further, data sources 218, 220, 222 can also deliver ads in its data source markup language as "stories", or in its stories.

Figure 3:
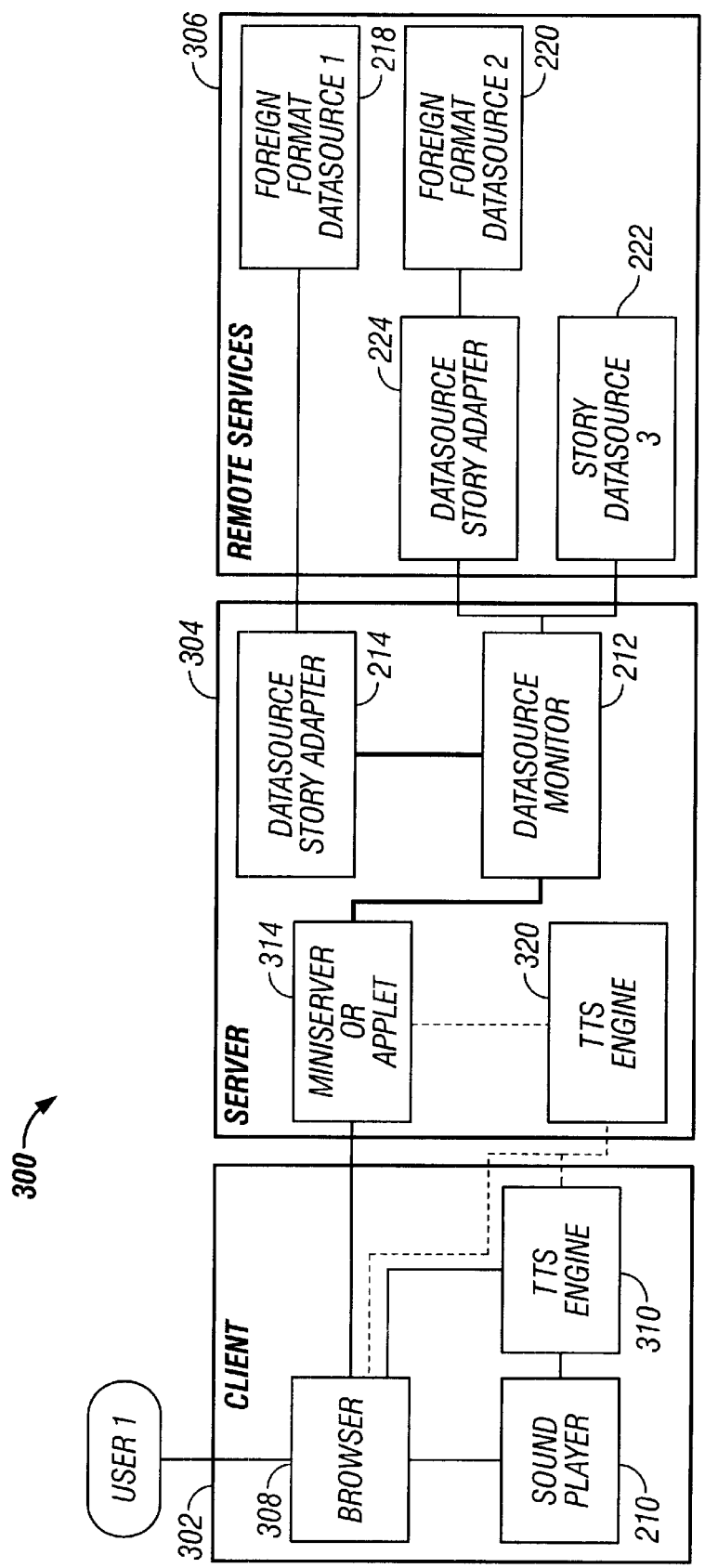
FIG. 3 is a block diagram of a three-tier architecture for providing speech-synthesized information in accordance with the present invention.

A three-tier embodiment of the present invention for notice server 300 is shown in FIG. 3, including client 302, server 304, and remote services 306. Notice system 300 provides capabilities and advantages that are virtually identical to notice system 200 including providing customized delivery of stories in speech-synthesized format as well as in a window on a display as the stories become available, auto-personalization, categorizing data sources 218, 220, 222, and categorizing stories. One of the differences between notice system 200 and notice system 300 is that client 302 is a "thin" client architecture, whereas client 204 in notice system 200 (FIG. 2) is a "fat" client architecture. Miniserver 206 provides enough functionality in client 204 to eliminate any requirement for a separate server, such as server 304 in notice system 300.

Client 302 in notice system 300 further includes browser 308, TTS engine 310, and sound player 210. Server 304 includes miniserver 314, data source story adapter 214, and data source monitor 212. In an alternate embodiment, TTS engine 320 resides in server 304, thereby replacing TTS engine 310 in client 302. In both notice system 200 (FIG. 2) and notice system 300, the TTS engine may be located on the client side, (e.g. TTS engine 208 or 310) or in a computer system that is remote from the client side (e.g., TTS engine 226 or 320).

Two issues that arise when TTS is performed remote from the client side are the computational resources required to convert text to speech, and the bandwidth required to transfer speed data from the remote processor to the client side. One alternative is to distribute TTS engines 208, 310 throughout notice system 200 or 300 to reduce bandwidth and computational burden on a single TTS engine. In many types of text to speech converters, functions of TTS engines 208, 226, 310, 320 can be broken down into a composition of functions g(f(x)). One type of known TTS engine 208, 226, 310, 320 involves expanding text (x) into phonemes in the function f(x) and requires a large dictionary for translating graphemes to phonemes. A phoneme is a component part or unit in the pronunciation of a word in the sound system of a language. The function g(f(x)) computes sounds that represent the phonemes and could be more computationally intensive compared to the function f(x). Converting the phonemes to representative sounds, also referred to as audio data, generates a large amount of data, even when audio compression schemes are utilized. Ideally, this conversion is performed on client side 204, 302 to alleviate the need to transfer a large amount of audio data from remote services 216 or server 304.

Figure 4:
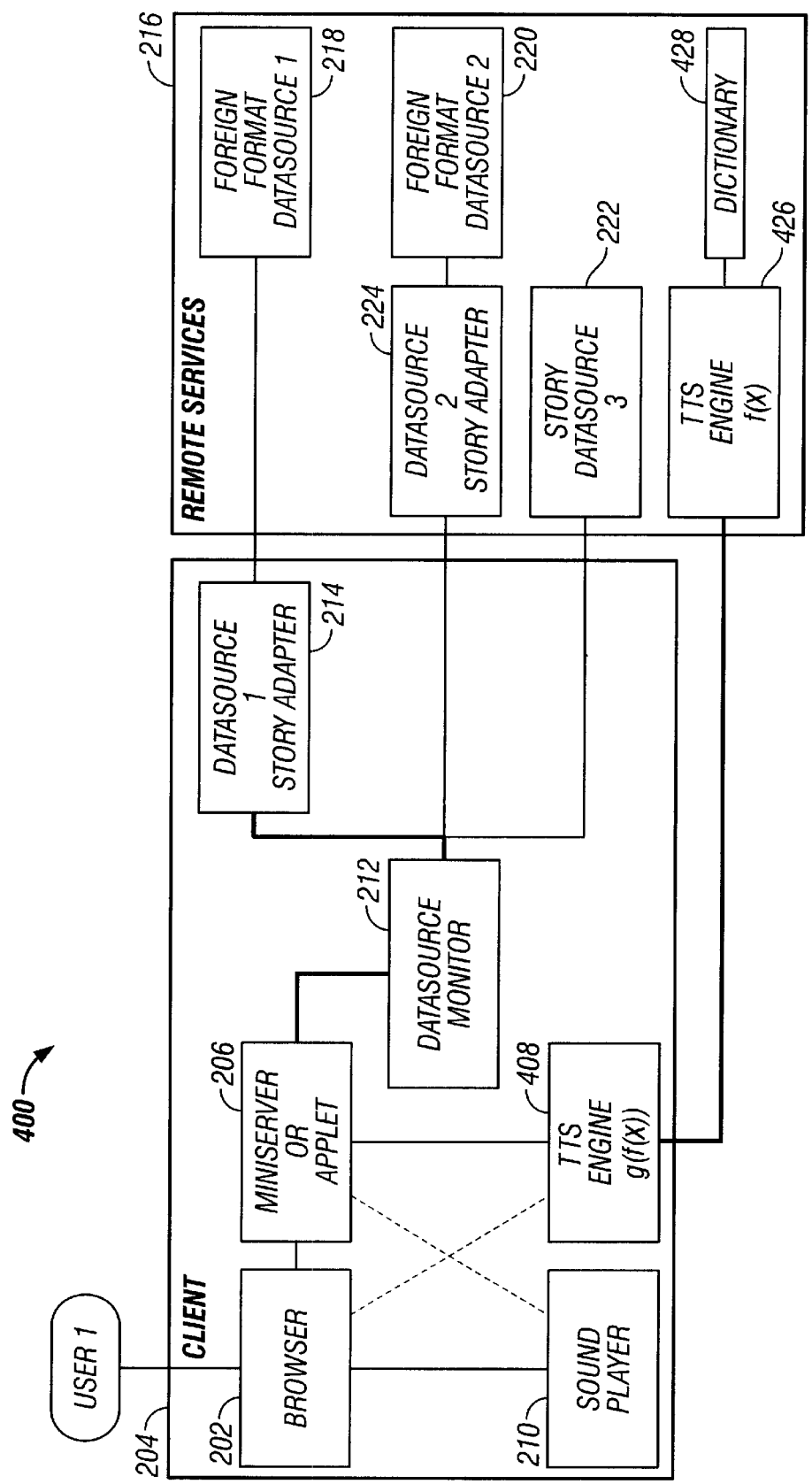
FIG. 4 is a block diagram of a two-tier architecture for providing speech-synthesized information with distributed text to speech processing in accordance with the present invention.

Thus, in an embodiment of the two-tier architecture 400 shown in FIG. 4, f(x) is distributed in TTS engine 426 where remote services 216 has storage capacity for the large word-to-phoneme dictionary 428. Further, g(f(x)) is distributed in TTS engine 408 on client side 204, thereby offloading heavy computational workload and data transfer requirements from remote services 216.

Figure 5:
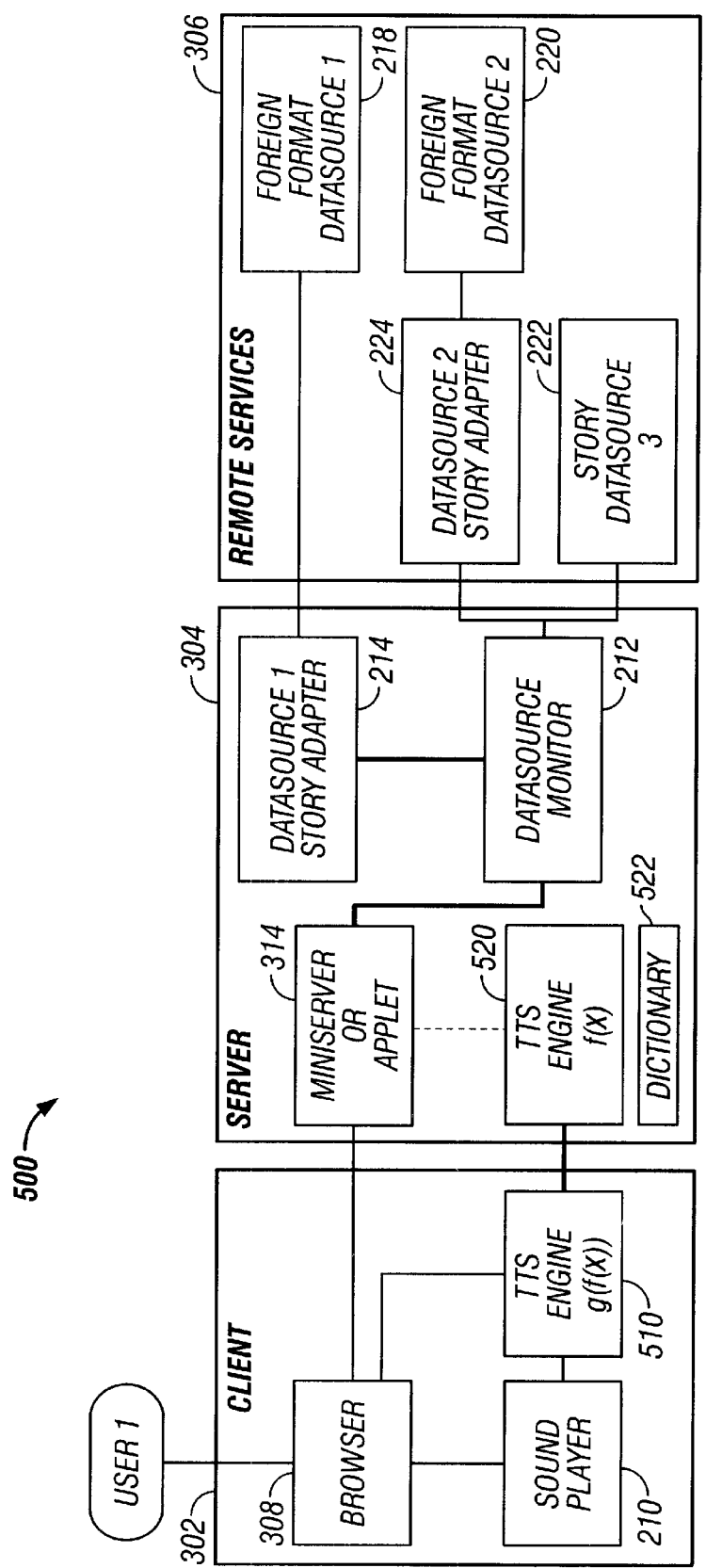
FIG. 5 is a block diagram of a three-tier architecture for providing speech-synthesized information with distributed text to speech processing in accordance with the present invention.

Likewise, in an embodiment of the three-tier architecture 500 shown in FIG. 5, f(x) is distributed in TTS engine 520 in server 304, which has storage capacity for the large word-to-phoneme dictionary 522, and g(f(x)) is distributed to TTS engine 510 on client side 302, thereby offloading heavy computational workload and data transfer requirements from server 304.

Server 304 performs data source monitoring via data source monitor 212, as discussed hereinabove for notice system 200. Server 304 also manages state information including user registrations, subscriptions, data source definitions, stories, user preferences, user profiles, data source profiles, data source categories, and other information. Server 304 stores most of the state information in relational databases. Further, server 304 may perform data source interfacing, such as converting information in a foreign format to story format using data source adapter 214. Alternatively, a required data source adapter, such as data source adapter 224, may reside in remote services 306.

Notice system 300 also includes capabilities for client 302 to pull stories from data sources 218, 220, 222, and for remote services 216 to push stories to client 302, through server 304. For data sources that do not push stories to client 302 via server 304, data source monitor 212 polls data sources 218, 220, 222 periodically to check the availability of new stories in a manner similar to that described in the discussion for notice system 200 hereinabove.

Notice systems, such as notice systems 200 and 300, may serve audio advertisements with headlines. These audio ads can be personalized based on the headlines, the user's profile, and other information. Notice systems 200, 300 may also place advertisements on the summary pages served to clients 204, 302, respectively. The advertisements can be personalized based on the data source, current stories, the user's profile, and other information that may be customized by the user. Further, data sources 218, 220, 222 can also deliver ads in its data source markup language as "stories", or in its stories.

While the invention has been described with respect to the embodiments and variations set forth above, these embodiments and variations are illustrative and the invention is not to be considered limited in scope to these embodiments and variations. For example, although a TTS engine for converting graphemes to phonemes has been discussed as an example of a TTS engine that may utilize the present invention, the present invention may also be utilized with other similar functions which compute intermediate representations and generate a relatively small amount of data compared to the final audio output. Further, several different databases may be included in one remote location, such as grapheme to phomeme dictionaries for a variety of different languages. Accordingly, various other embodiments and modifications and improvements not described herein may be within the spirit and scope of the present invention, as defined by the following claims.

What is claimed is:

1. A system for converting information from a text format to an audio format, the system comprising:
   at least one data source;
   a server side data processor;
   a client side data processor;
   a first set of program instructions executable on the server side data processor, the first set of program instructions including:
      first program instructions being operable to receive information from the data source;
      second program instructions being operable to convert the information from the text format to an intermediate phonemic representation;
      third program instructions being operable to transmit the information in the intermediate phonemic representation to the client side data processor; and
   a second set of program instructions executable on the client side data processor, the second set of program instructions including:
      fourth program instructions being operable to convert the information from the intermediate phonemic representation to the audio format.

2. The system, as set forth in claim 1, wherein the second set of program instructions convert the information in the text format into phonemes.

3. The system, as set forth in claim 2, further comprising:
   a dictionary for translating the text to phonemes, wherein the dictionary is
      stored in a location that is accessible by the first processor.

4. The system, as set forth in claim 3, wherein the fourth program instructions convert the phonemes to audio output signals.

5. The computer program product, as set forth in claim 4, further comprising:
   a dictionary for translating graphemes to phonemes, wherein the dictionary is
      stored in a location that is accessible by the first function.

6. A computer program product for dynamically generating audible notices from an information network, the information network including a client processor and a remote processor, the computer product comprising:

first program instructions being operable to allow a user to preselect at least one data source, wherein the data source is accessible from the information network;

second program instructions being operable to receive information from the at least one preselected data source; and third program instructions being operable to convert the information from a text format to an audio format, wherein the third program instructions perform a first function for generating an intermediate phonemic representation of the information and a second function for generating an audio representation of the information based on the intermediate phonemic representation of the information, wherein the first function is performed in the remote processor and the second function is performed in the client processor.

7. The computer program product, as set forth in claim 6, wherein the first function converts the text into phonemes.

8. The computer program product, as set forth in claim 7, wherein the second function generates a representation of sounds based on the phonemes.

9. The computer program product of claim 6, wherein said second program instructions are operable to receive information from the at least one preselected data source as information becomes available from the data source, and wherein said third program instructions are operable to automatically convert the information from a text format to an audio format.

10. A method for dynamically generating audible notices from an information network, the method comprising:

preselecting at least one data source, wherein the data source is accessible from the information network;

receiving information from the at least one preselected data source;

converting the information from a text format to an intermediate phonemic representation in a remote processor;

converting the information from the intermediate phonemic representation to an audio format in a client processor; and transmitting audio signals representative of the information in audio format.

11. The method, as set forth in claim 10, wherein the first function converts the text into phonemes.

12. The method, as set forth in claim 11, further comprising:

a dictionary for translating graphemes to phonemes, wherein the dictionary is stored in a location that is accessible by the remote processor.

13. The method, as set forth in claim 11, wherein the second function generates a representation of sounds based on the phonemes.

14. The method, as set forth in claim 10, wherein the remote processor is a server side processor.

15. The system, as set forth in claim 14, wherein the second remote program instructions convert the text into phonemes.

16. The system, as set forth in claim 14, wherein the remote computer system is a server computer system.

17. The method of claim 10, wherein said information is received from the at least one preselected data source as information becomes available, and said transmitting of audio signals representative of the information in audio format occurs automatically.

18. A system for dynamically generating audible notices from an information network, the method comprising:

at least one data source;

a client computer system;

a remote computer system;

a set of remote program instructions executable on the remote computer system, the remote program instructions including:

first remote program instructions being operable to receive information from a data source;

second remote program instructions being operable to convert the information from a text format to an intermediate phonemic representation;

third remote program instructions being operable to transmit the information in intermediate phonemic representation to the client computer system; and a set of client program instructions executable on the client computer system, the client program instructions including:

first client program instructions being operable to convert the information from the intermediate phonemic representation to an audio format.

19. The system, as set forth in claim 18, further comprising:

a dictionary for translating the text to phonemes, wherein the dictionary is stored in a location that is accessible by the remote processor.

20. The system, as set forth in claim 18, wherein the first client program instructions convert the phonemes to audio output signals.

* * * * *